United States Patent [19]

Hall

[11] Patent Number: 5,491,717
[45] Date of Patent: Feb. 13, 1996

[54] METHOD FOR CONTROLLING TRANSMISSION DURING HANDOFF IN A COMMUNICATION SYSTEM

[75] Inventor: Scott M. Hall, Fort Worth, Tex.

[73] Assignee: Motorola, Inc., Schaumburg, Ill.

[21] Appl. No.: 137,334

[22] Filed: Oct. 18, 1993

[51] Int. Cl.⁶ .......................... H04J 13/02; H04J 13/04; H04Q 7/22
[52] U.S. Cl. .................. 375/205; 375/200; 375/201; 375/206; 380/34; 379/58; 379/59; 379/60; 455/33.1; 455/33.2; 455/53.1; 455/54.1; 455/54.2; 455/67.1; 455/67.3; 370/18
[58] Field of Search .................. 455/33.1, 33.2, 455/53.1, 54.1, 54.2, 56.1, 67.1, 67.3; 379/58–60; 370/18

[56] References Cited

U.S. PATENT DOCUMENTS

| | | | |
|---|---|---|---|
| 4,475,010 | 10/1984 | Huensch et al. | 379/60 X |
| 4,696,027 | 9/1987 | Bonta | 379/60 |
| 4,718,081 | 1/1988 | Brenig | 379/60 |
| 4,926,421 | 5/1990 | Kawano et al. | 379/60 X |
| 5,056,109 | 10/1991 | Gilhousen et al. | 375/1 |
| 5,175,867 | 12/1992 | Wejke et al. | 455/33.1 |
| 5,243,641 | 9/1993 | Evans et al. | 379/60 X |
| 5,276,906 | 1/1994 | Felix | 455/33.2 |

Primary Examiner—Bernarr E. Gregory
Attorney, Agent, or Firm—Raymond J. Warren

[57] ABSTRACT

Transmission is controlled using the present method after a handoff procedure has been entered between a subscriber unit and target transceivers. During this process, a communication link between the subscriber and at least one other transceiver is maintained. A quality factor of a signal from the subscriber is received by the target transceiver. If the quality factor meets a quality threshold, then a transmission from the target transceiver is activated. If the target transceiver is active and the quality factor drops below the quality threshold, then the transmission from the target transceiver is terminated.

23 Claims, 7 Drawing Sheets

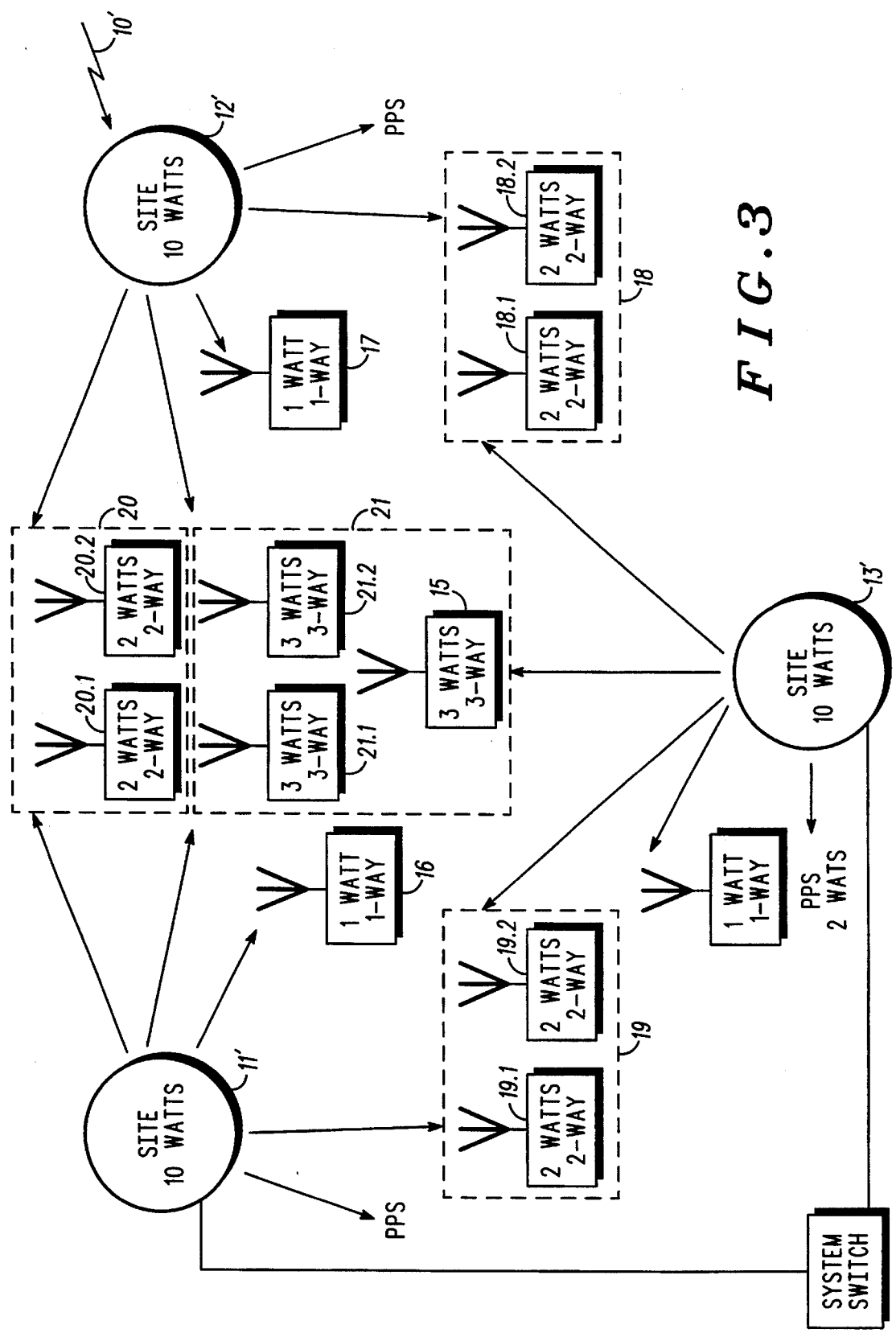

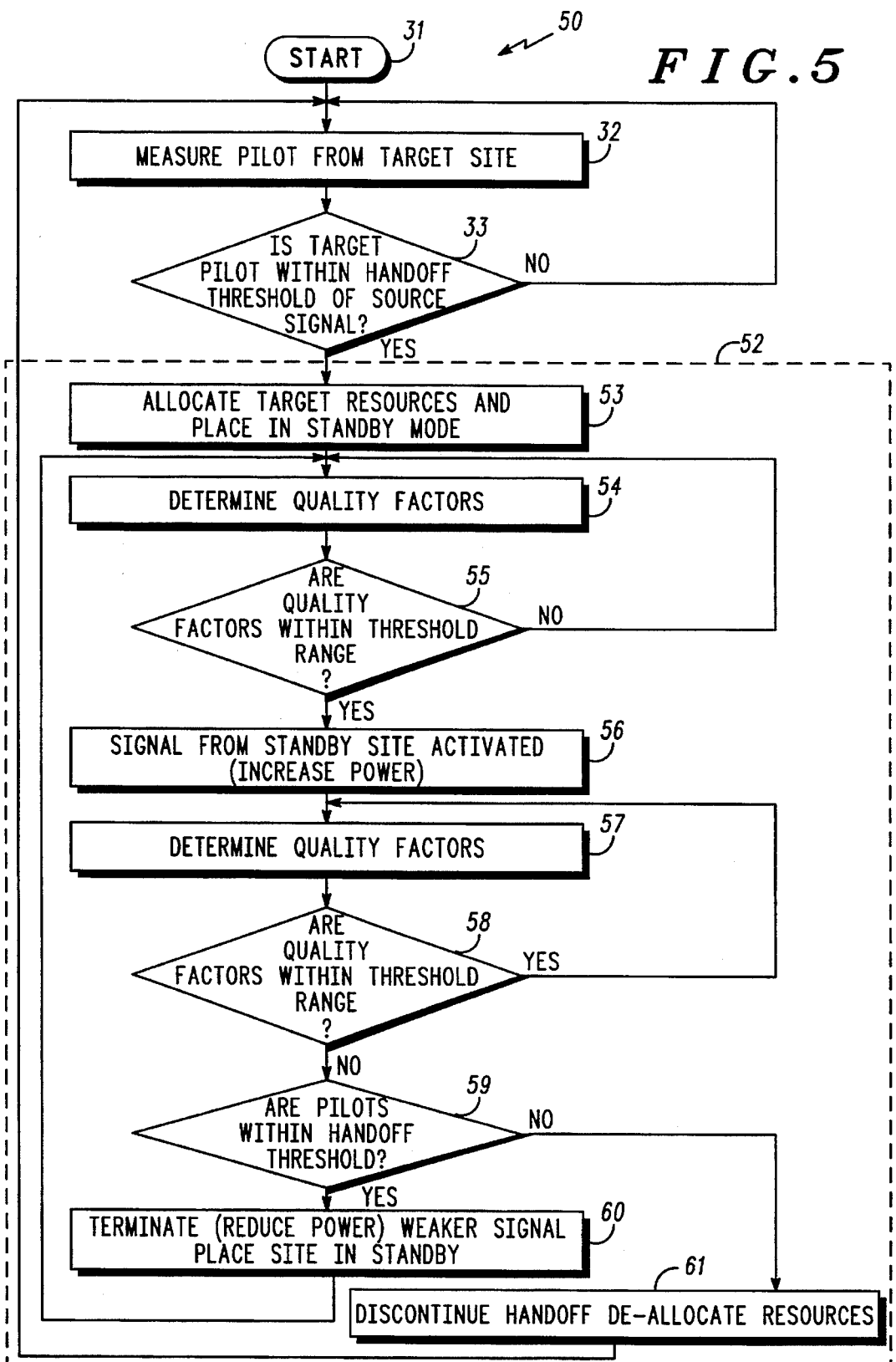

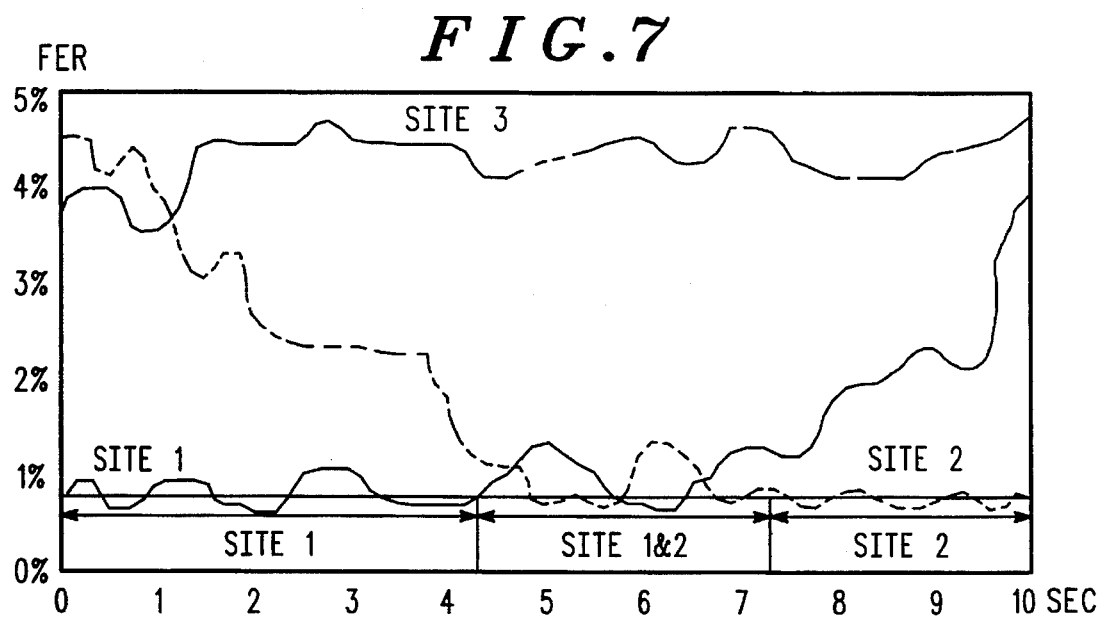
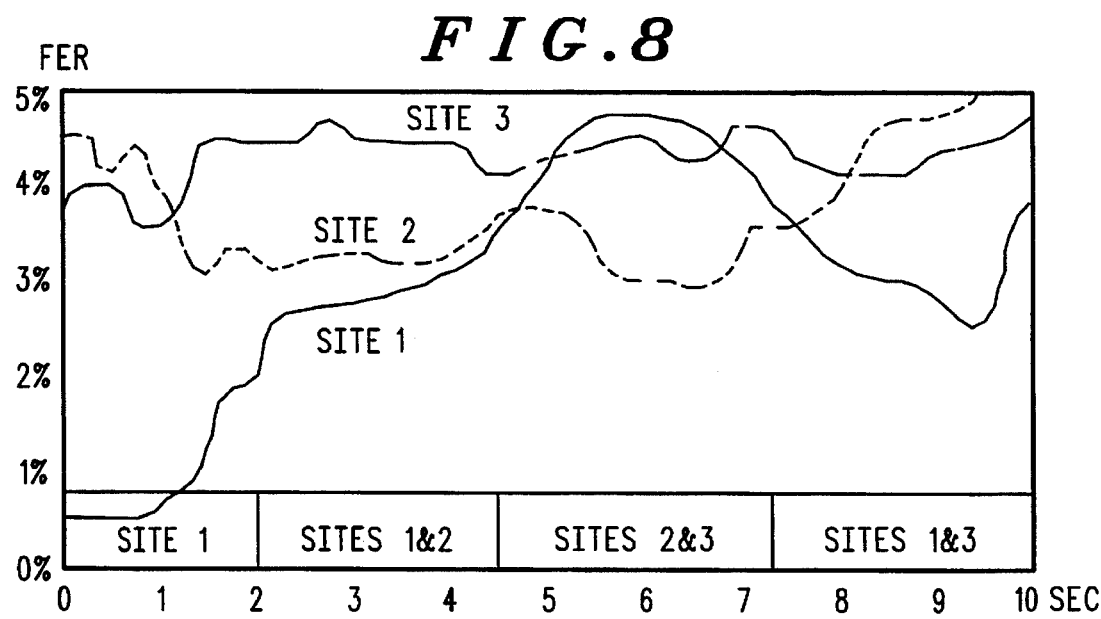

METHOD FOR CONTROLLING TRANSMISSION DURING HANDOFF IN A COMMUNICATION SYSTEM

FIELD OF THE INVENTION

The present invention relates, in general, to communication systems and, more particularly, to a method for controlling transmission during handoff in a communication system.

BACKGROUND OF THE INVENTION

There are a number of different methods of conducting handoff in a cellular communication system. Handoff is the act of transferring a call with a subscriber (e.g., mobile, portable, etc.) from one transceiver, a source transceiver, to a second transceiver, a target transceiver. In frequency division multiple access (FDMA) systems, such as the Analog Mobile Phone Standard (AMPS) system, when a call is handed from one transceiver to another, the connection to the first transceiver is broken and quickly established with a second transceiver. While handoffs can be performed quickly, the quality suffers during handoff and connections can be missed; resulting in calls being dropped.

To resolve these types of problems, the idea of soft and softer handoffs was developed. A soft handoff is a handoff between one site and another. A softer handoff is a handoff between one sector and another sector, both located at the same site. The basic concept of soft/softer handoff is that the new connection is established with the second transceiver before the connection with the first transceiver is broken.

The implementation of the present invention will be described in conjunction with direct sequence code division multiple access (DS-CDMA) systems, but is not limited to those applications. In DS-CDMA systems, the transmissions of a plurality of signals are carried over the same spectral resource (band width). This spectral resource may be either a wide (e.g., around 5 or more MHz) or narrow (e.g., around 1.2 or less MHz) frequency band. The signals are distributed, spread, throughout the band using a code. This same code is then used by the receiver to retrieve, despread, the signal.

The limitation on the number of signals which can be carried on the band is closely associated with the total power of all signals in the band. A more detailed description of power control in DS-CDMA systems is provided in U.S. patent applications: "Method for Compensating for Capacity Overload in a Spread Spectrum Communication System" having Ser. No. 07/783,751 filed on Oct. 28, 1991, now U.S. Pat. No. 5,245,627; and "A Method for Controlling Transmission Power in a Communication System" having Ser. No. 07/907,072 filed on Jul. 1, 1992, both assigned to the present assignee.

While the soft/softer handoff techniques provide higher quality signals to the receiver, it is at the expense of overall system capacity. When multiple transmitters are transmitting the same signal, capacity is being used that could be allocated to other users. Therefore, there is a need to reduce the amount of system power required to perform handoffs while at the same time retaining the benefits of soft/softer handoffs.

BRIEF DESCRIPTION OF THE DRAWINGS

FIG. 3 is a system diagram illustrating a handoff technique incorporating the present invention;

FIG. 5 is a flow chart illustrating a handoff process embodying the present invention;

FIG. 7 is a graph illustrating a frame error rate implementation of the present invention;

FIG. 8 is a graph illustrating a modified frame error rate implementation of the present invention.

DETAILED DESCRIPTION OF THE DRAWINGS

Figure 1:
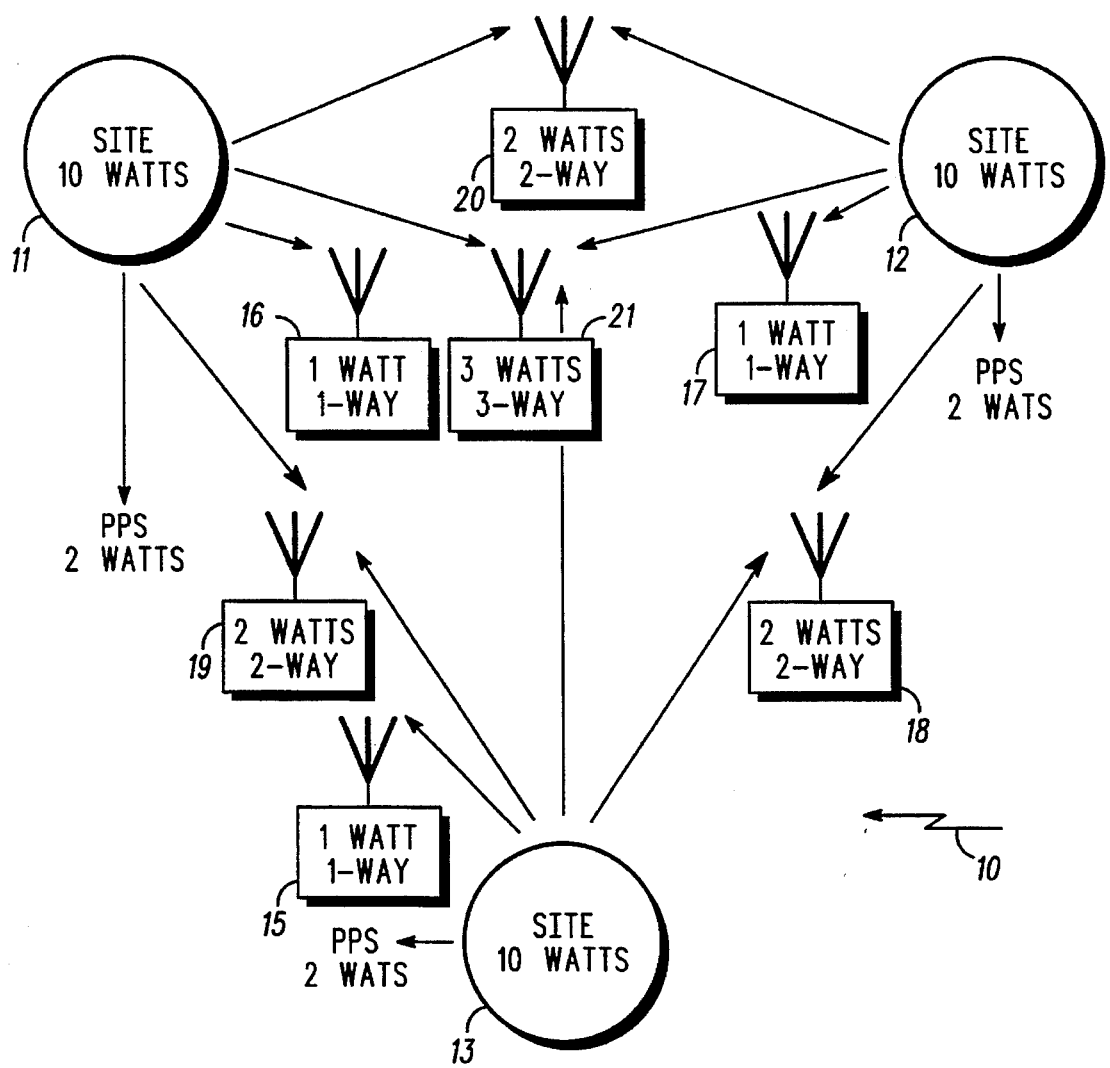
FIG. 1 is a system diagram illustrating a prior art handoff technique.

Referring initially to FIG. 1, a prior art communication system, generally designated 10, is illustrated. System 10 is a DS-CDMA system having three sites 11–13. In this example, each site has 10 watts of power to use for transmission of signals. It should be noted here, that the 10 watts of power per cell is used solely as an example and that a typical cell may operate at around 100 watts. This assumes that the system is self interference limited such that with 100 watts of cell power the power needed to talk to an individual subscriber increases by a factor of 10. If the system is not self interference limited, then non-CDMA noise including thermal noise will occupy some of the forward capacity, which will reduce to CDMA user capacity. A detailed explanation of this is provided in the power control DS-CDMA references cited above. Within system 10 is a plurality of subscribers 15–21, each receiving a signal from one or more of sites 11–13.

Each site 11–13 has a 2 watt pilot, page, and synchronization (PPS) signal which is used to transmit general broadcast signals. When a user is attempting to access the system, it will first acquire this PPS signal to receive access instructions. The 2 watts of power used for this signal is 20% of the total power available from the 10 watt site. The remaining 80% of the power is available for direct communication with system users.

In system 10 three of the subscribers (15–17) are within the coverage area of individual sites. These are designated as 1-way subscribers. The respective sites each expend 1 watt of power transmitting to these 1-way subscribers. Subscribers 18–20 have entered a region between sites where handoff procedures have been commenced. These subscribers are labeled 2-way subscribers. Here, because of the distance and co-channel interference from the other sites, each cell transmitting to a 2-way user is using 2 watts of power. For example, site 11 transmits to subscriber 20 using 2 watts of power at the same time site 12 transmits to subscriber 20 using 2 watts of power. From a system perspective, 1 watt of transmit power is used to communicate with subscriber 16, whereas 4 watts of power are used to communicate with subscriber 20.

The final user, subscriber 21, is a 3-way user located in an area covered by all three sites. Each site 11–13 is in contact with subscriber 21 and, again because of the distance and co-channel interference, each site uses 3 watts of transmit power to communicate with subscriber 21. Therefore, 9 watts of system power is being expended to communicate with subscriber 21 as compared to 1 watt for subscribers 15–17.

A subscriber enters a handoff procedure when it enters an area where pilots transmitted from one or more sites have a received strength within a handoff threshold range. Using a mobile assisted handoff (MAHO) technique as an example, the subscriber periodically measures pilots from sites previously identified by the system. For example, subscriber 21 would have been directed to measure the pilot transmissions from sites 11–13. The pilot strength and total received power measured by the subscriber unit are typically reported to the site in the overhead signals. When subscriber 21 has reached a point where the pilot from site 11 is within a certain level of the pilot from site 12 (e.g. 16 dBm) then handoff will be implemented and both sites will begin serving subscriber 21. Likewise, when the pilot from site 13 is within that level, site 13 will also begin serving subscriber 21.

In application, even though all three sites (11–13) are transmitting to subscriber 21, subscriber 21 may only be utilizing one of the transmissions, the other ones being too weak as compared with the best signal. This means that, with regard to subscriber 21, either 3 or 6 watts of system power is being wasted in that this extra power being pumped into the system raises the noise level $N_o$ for the system. In general, a higher system $N_o$ results in the power to each of the other subscribers in the system being increased to maintain a desired $E_b/N_o$ (signal-to-noise) ratio or frame error rate (FER), resulting in fewer users being permitted on the system.

With the even distribution of users illustrated in FIG. 1, the percent of transmit power allocated to each group of users of each site is allocated as shown in Table A.

TABLE A

POWER ALLOCATION FOR A SECTOR

| USER | Handoff Factor | NUMBER | POWER | POWER PERCENT |
|---|---|---|---|---|
| PPS | — | — | 2 WATTS | 20% |
| 1-WAY | 1.00 | 1 USER | 1 WATTS | 10% |
| 2-WAY | 2.00 | 2 USERS | 4 WATTS | 40% |
| 3-WAY | 3.00 | 1 USER | 3 WATTS | 30% |
| TOTAL | | 4 USERS | 10 WATTS | 100% |

The distribution of the users in the system is provided in Table B below.

TABLE B

USER DISTRIBUTION FOR SYSTEM

| USER | NUMBER | DISTRIBUTION |
|---|---|---|
| 1-WAY | 1 USER | 10% |
| 2-WAY | 2 USERS | 40% |
| 3-WAY | 1 USER | 30% |
| TOTAL | 4 USERS | 100% |

Figure 2:
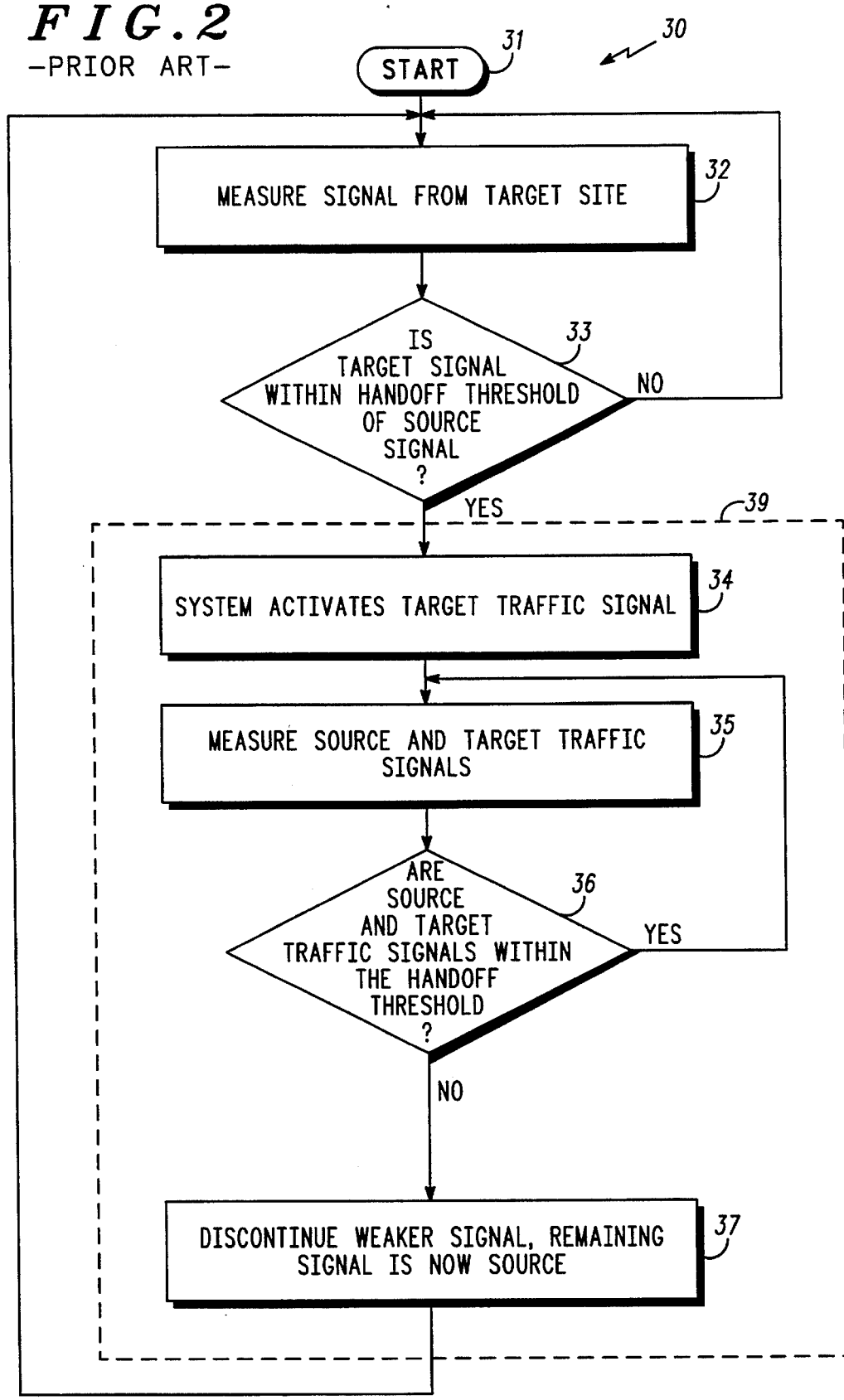
FIG. 2 is a flow chart of a prior art handoff method.

The average transmit power of a cell site allocated per user is 34.3% as determined by equation (1).

$$\text{Avg. Alloc.} = \sum_{1}^{n} [(\text{Power Percentage})] \times \tag{1}$$

$$(\text{Handoff Factor}) \times [(n\text{-way Units})/(\text{Total Units})] =$$

$$(10\% \times 1 \times 3/7) + (20\% \times 2 \times 3/7) +$$

$$(30\% \times 3 \times 1/7) = 34.3\%$$

where:
Power Percentage is the percent of transmit power expended by the site for communication with that class (n-way) of user;
Handoff Factor is the number of sites serving that class of user (e.g., during a two site handoff, two sites serve the subscriber the entire time);
n-way Units is the number of units for that class; and
Total Units is the total number of units in the system. The above calculation results in a forward capacity for a cell/sector of 2.33 users per cell/sector. This is determined by Forward Capacity equation (2).

$$\text{Forward Capacity} = (\text{Cell Capacity for Users})/ \tag{2}$$

$$(\text{Avg. Alloc.}) = (100\% - 20\%)/34.3\% = 2.33$$

where:
Cell Capacity for Users is the total capacity (100%) less the capacity used for PPS (20%); and
Average Allocation is that determined in equation (1). This means that even though each sector is shown addressing four subscriber units, the system capacity is only 2.33 users/sector without the present invention. This is a result of the number of handoffs in progress Referring now to FIG. 2, a flow chart, generally designated 30, illustrating a prior art handoff process is shown. Process 30 commences at start step 31 and measures a pilot from a target site, step 32. If the target pilot is not within a handoff threshold, in this example 16 dB, of the source pilot, process 30 loops back to step 32. If the target pilot is within the handoff threshold, then the subscriber enters handoff, subprocess 39.

In handoff, the system activates a traffic channel from the target, step 34. The subscriber unit will continue to measure the pilots from the source and target sites, step 35. If the two signals are within a predetermined range, handoff threshold, of each other, then subprocess 39 loops back to step 35. If the two pilots are not within the predetermined range, then the system discontinues the traffic channel of the site with the weaker pilot, step 37, and the site transmitting the remaining traffic channel is designated the source site.

The same process is used in a 3-way handoff as described above. In this instance, two traffic channels from two target sites will be activated as each comes within the handoff threshold. These two sites do not have to be activated simultaneously. For a subscriber, such as subscriber 21, three sites will be providing a traffic signal during the entire handoff process. Again, detracting from the overall system capability.

A drawback of the prior art is that even though multiple traffic channels, one per site, will be transmitted to a user during handoff, often only one of those traffic channels will be processed by the subscriber unit. For example, subscriber 19 is currently being serviced by sites 11 and 13. If the signal (traffic channel) transmitted from site 11 is at −100 dBm at subscriber 19 and the signal transmitted from site 13 is at −110 dBm at subscriber 19, then subscriber 19 will process the signal transmitted from site 11 and not the signal from site 13. This occurs because there is enough difference in the signals such that the signal from site 13 is lower (e.g., 6 dB) as compared with the signal from site 11. As a result, the power used to transmit the signal from site 13 was wasted power in that it added to the noise level thereby removing capacity from the overall system.

In FIG. 3, a system diagram, generally designated 10', illustrating a handoff technique incorporating the present invention is shown. To illustrate the present invention, the 2-way units 18–20 have each been divided into two units (e.g. 18.1 and 18.2). This is to illustrate that while both serving sites have dedicated resources to the particular subscriber unit, only one of the sites may be transmitting to the unit. Similarly, subscriber unit 21 has been separated into three units designated 21.1, 21.2 and 21.3.

In operation, as subscriber 18 moves from site 13' toward site 12', a point is reached where the system will direct site 12' to open a traffic channel to subscriber 18.2. At this point, however, only site 13' is transmitting a traffic channel to subscriber 18.1, as opposed to the prior art where traffic channels would be transmitted from both serving sites. The system will continue to monitor the subscriber until a point is reached where a secondary, or quality, threshold is reached. This can be determined by having the sites monitor the traffic signal from the subscriber unit. Alternatively, the subscriber unit can monitor pilots from the cell sites and provide information to the system based upon those measurements.

Once within the transmit threshold, both cell sites will transmit to the subscriber unit as before. However, by delaying the point at which the multiple transmissions to a single subscriber start, the system capacity can be increased significantly.

Figure 4:
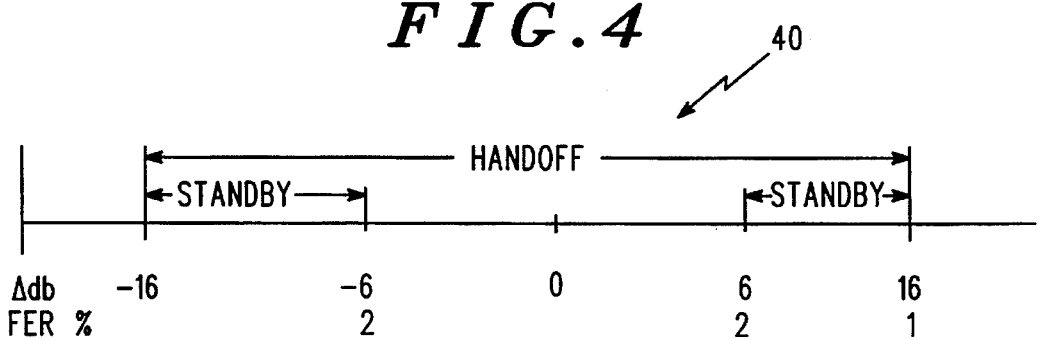
FIG. 4 is a line chart illustrating the operation of a handoff process embodying the present invention.

This is illustrated by the line graph, generally designated 40, of FIG. 4. The line graph is a graph, in dB, of the difference between the pilots from the two sites (target less source). At the point where the target pilot would be 16 dBm less than the source pilot, handoff is entered and resources at the target are allocated for the handoff. However, under the present invention, no signal is transmitted or the traffic channel. In other words, the target is placed in a standby mode. Once the difference between the pilots reaches a transmit threshold (e.g. −6 dBm), then the normal 2-way service is provided by transmitting signals from both the source and target sites.

As the subscriber moves closer to the target site, the pilot from the target will reach a point where it crosses the transmit threshold at the other end of the scale (6 dBm). At this point, the source site would be placed in standby. As the subscriber unit continues to approach the target, the handoff threshold, 16 dBm, will be exceeded and the source site will discontinue service. The target site will then be designated the new source site.

It should be understood that since subscriber units may not move directly from one cell to another, the source and target sites may alternately move in and out of standby several times until the handoff procedure is completed. In addition, the result of the handoff may be that the original source site remains the source site. This would occur when the pilot from the source became stronger again after handoff was entered. In order to prevent a ping-pong effect where a site moves in and out of standby mode, a delay may be added to place the site in a particular mode for some minimum amount of time (e.g., 5 seconds). This can be performed by a timer or through counting transmission frames or slots.

By utilizing the present invention, the capacity of the system can be improved as demonstrated by Table C below.

TABLE C

POWER ALLOCATION FOR A SECTOR

| USER | Handoff Factor | NUMBER | POWER | POWER PERCENT |
|---|---|---|---|---|
| PPS | — | — | 2 WATTS | 20% |
| 1-WAY | 1.00 | 1 USER | 1 WATTS | 10% |
| 2-WAY | 1.25 | 2 USERS | 4 WATTS | 40% |
| 3-WAY | 1.50 | 1 USER | 3 WATTS | 30% |
| TOTAL | | 4 USERS | 10 WATTS | 100% |

TABLE C-continued

The average transmit power allocated per user is 21.4% as determined using equation (1), above. Using this result in equation (2) gives a forward capacity of 3.7 users per cell/sector. This is an increase in capacity of almost 60%. The primary difference here is found in the handoff factor. Because the units are not being serviced by multiple sites during the entire time they are in handoff, there is more capacity available for the system. The handoff factors provided in Table B are an estimate of the average handoff factor that will be experienced in an average site. Actual figures may vary.

Referring now to FIG. 5, a flow chart illustrating a process, generally designated 50, is shown. Process 50 commences at 31 and measures the pilot from the target site as in the prior art. Next, it is determined if the target pilot is within the handoff threshold, decision step 33. If not, process 50 loops back to step 32. If the target pilot is within the handoff threshold, then subprocess 52 is entered.

Once subprocess 52 is entered, the system sets up the handoff by allocating the appropriate resources at the target site. However, at this time, the site is placed in standby and does not actually transmit, or transmits a very low power signal to reserve the resources. Next, quality factors are determined at the cell sites. These quality factors may be subscriber received $E_b/N_o$, frame error rate (FER), etc. It should be noted here that the term "frame error rate" is often used interchangeably with "frame erasure rate". The distinction is that frames in which errors exist and are detected are erased frames. These erased frames are then counted to give a frame erasure rate. Frames in which errors exist but are not detected are still frame errors, but are not counted to give a frame erasure rate. Under test conditions when a known signal is transmitted on a traffic channel, a true frame error rate can be determined. In normal operation, when an unknown signal is transmitted, the frame erasure rate is used as a substitute.

Returning to process 50, once the received signal quality factors are determined, they are compared to determine if they fall within a transmit threshold range, decision step 55. If they are not within the transmit threshold range, then subprocess 52 loops back to step 54. If the quality factors are within the transmit threshold range, then the standby site is taken out of standby by activating the transmit signal, step 56. Alternatively, when the site is in standby, a very low power signal may be transmitted to have the transmit resources reserved. When the site is taken out of standby, the signal power is increased to a normal level.

Once multiple signals are activated, the system continues to monitor the quality of the received signals, step 57. Subprocess 52 then determines if the received signal quality factors are still within the transmit threshold range, decision step 58. If they are within the transmit threshold, then no change is made and subprocess 52 loops back to step 57. If the quality factors are not within the transmit threshold range, then subprocess 52 determines if the pilots are still within the handoff thresholds, decision step 59. If not, then the handoff process is discontinued by de-allocating the resources at the weaker cell site, step 61. If the pilots are still within the handoff threshold, then the weaker signal is terminated (or its power reduced) placing that site in standby, step 60. Subprocess 52 then loops back to step 54.

Examples of the signal information that can be utilized for received signal quality includes: reverse power control signal (available at the switch); means and standard deviation of the received signal-to-noise ratio ($E_b/N_o$); frame error/erasure rate; subscriber received pilot strength report message; subscriber received signal strength message, etc. The measurements may be made at the base sites and reported to a system controller or they can be measured by the mobile, such as in mobile assisted handoff (MAHO). If a MAHO type procedure is used, the mobile may either report measurements or request actions based upon its measurements.

Figure 6:
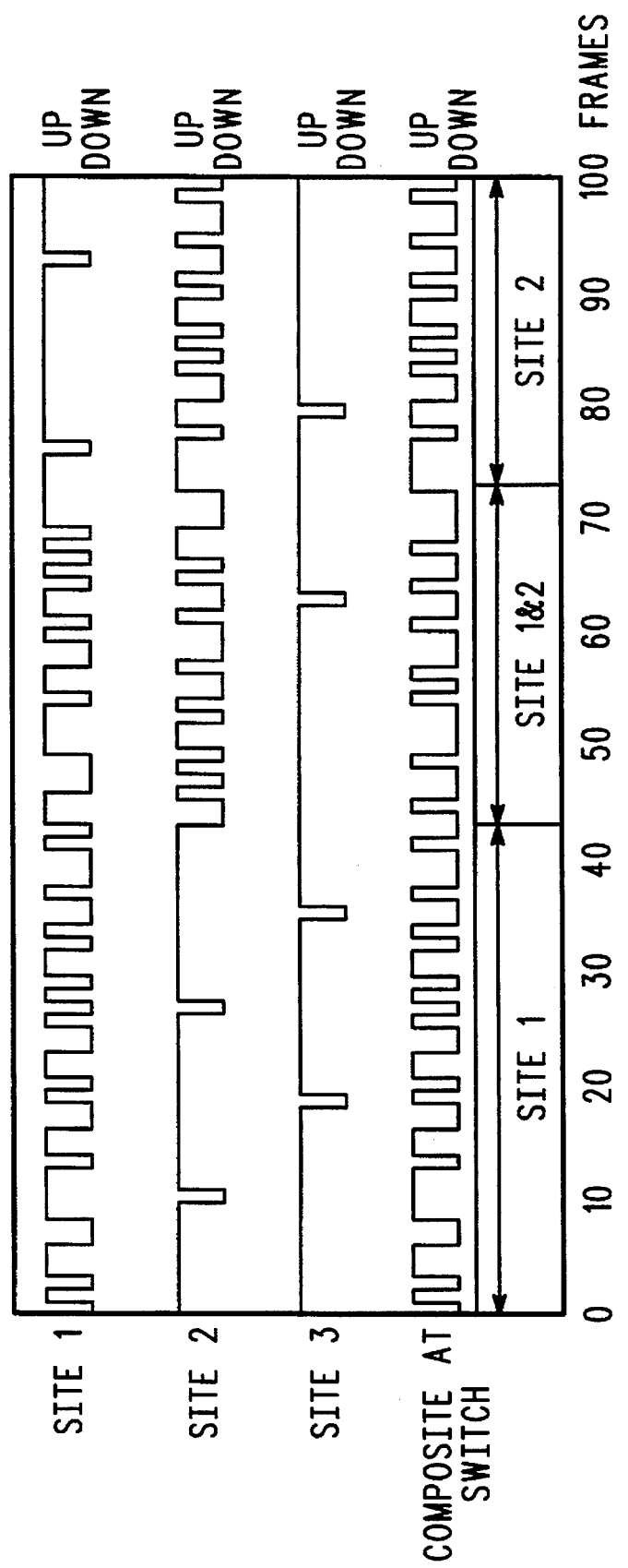
FIG. 6 is a graph illustrating a reverse power control implementation of the present invention.

One particular example of a quality factor used in the present invention is the Reverse Power Control signal illustrated in FIG. 6. In this chart, the reverse power control is being sent every frame and is either an up or a down power control. When the reverse power control is being toggled up and down regularly it indicates that the subscriber unit is within a range that it can be controlled by the cell site. When the reverse power control is mostly up, it indicates that the mobile is at a distance from the cell site that is to great for good reception of the signal.

As shown in FIG. 6, beginning at frame 0, site 1 has a reverse power control pattern that indicates an acceptable signal. On the other hand, sites 2 and 3 show an unacceptable received signal. Therefore, a signal on the traffic channel is transmitted from site 1 and sites 2 and 3 are placed in standby. At around frame 40, the reverse power control bits for site 2 begin to indicate that the received signal quality is approaching that of site 2. Therefore, site 2 will be taken out of standby and will begin transmitting a signal on a traffic channel to the unit. At around frame 70, the reverse power control bits for site 1 begin to indicate a poor power for the received quality signal. At this point, site 1 will be place in standby mode and stop transmitting. This type of measurement would continue until the handoff process was ended. As referred to above, starting and stopping a transmission relates only to the traffic channel for that subscriber. The site is still transmitting the PPS and other traffic signals.

Another received quality factor example is provided in FIG. 7 using the frame error (erasure) rate (FER). As shown at time 0, the frame error rate for site 1 is around 1%. Therefore, only site 1 is transmitting to the subscriber unit at that time. At 4 seconds, the FER for site 2 has decreased to around 1% and, at that time, site 2 will be taken out of standby and begin transmitting. At around 7 seconds, the FER for site 1 has increased to a point where it is no longer acceptable and site 1 is placed in standby. Again, this type of measurement would continue until the handoff process was ended.

In order to reduce erratic standby behavior, the received signal quality threshold can be an average or summed over a particular time period. For example in FIG. 6, the threshold used can be set to review the reverse power control signal over the last five frames. If the last five, or four of the last five, power control signals are up, then the transmitter is placed in standby, if currently active. In the same manner, a certain time delay can be added to the FER measurement of FIG. 7.

In addition to the process described above, the system can be designed to take into account the individual received signal quality levels in addition to the relative received quality levels. For example, even if the received signals to sites 1 and 2 do not fall within a received signal threshold range, if the quality of both received signals is poor, the system can be designed to activate transmission from both sites. This is demonstrated in FIG. 8.

In FIG. 8, the FER of all three received signals is poor. Therefore, the system will pick the two best sites and activate their transmissions. Here, the system starts out with the transmissions from sites 2 and 3 in standby. Then as the received signal quality from site 1 degrades, the second best received signal, at site 2, activates site 2 transmission in around 2 seconds. As the received signal from site 1 continues to degrade, the system will switch to sites 2 and 3 and places site 1 in standby, at around 4.5 seconds. As the received signal quality of site 1 begins to improve slightly, the system will switch to sites 1 and 3 and place site 2 in standby. This process would continue until either one received signal improved enough to serve the subscriber unit on its own or until the handoff process ended.

Figure 9:
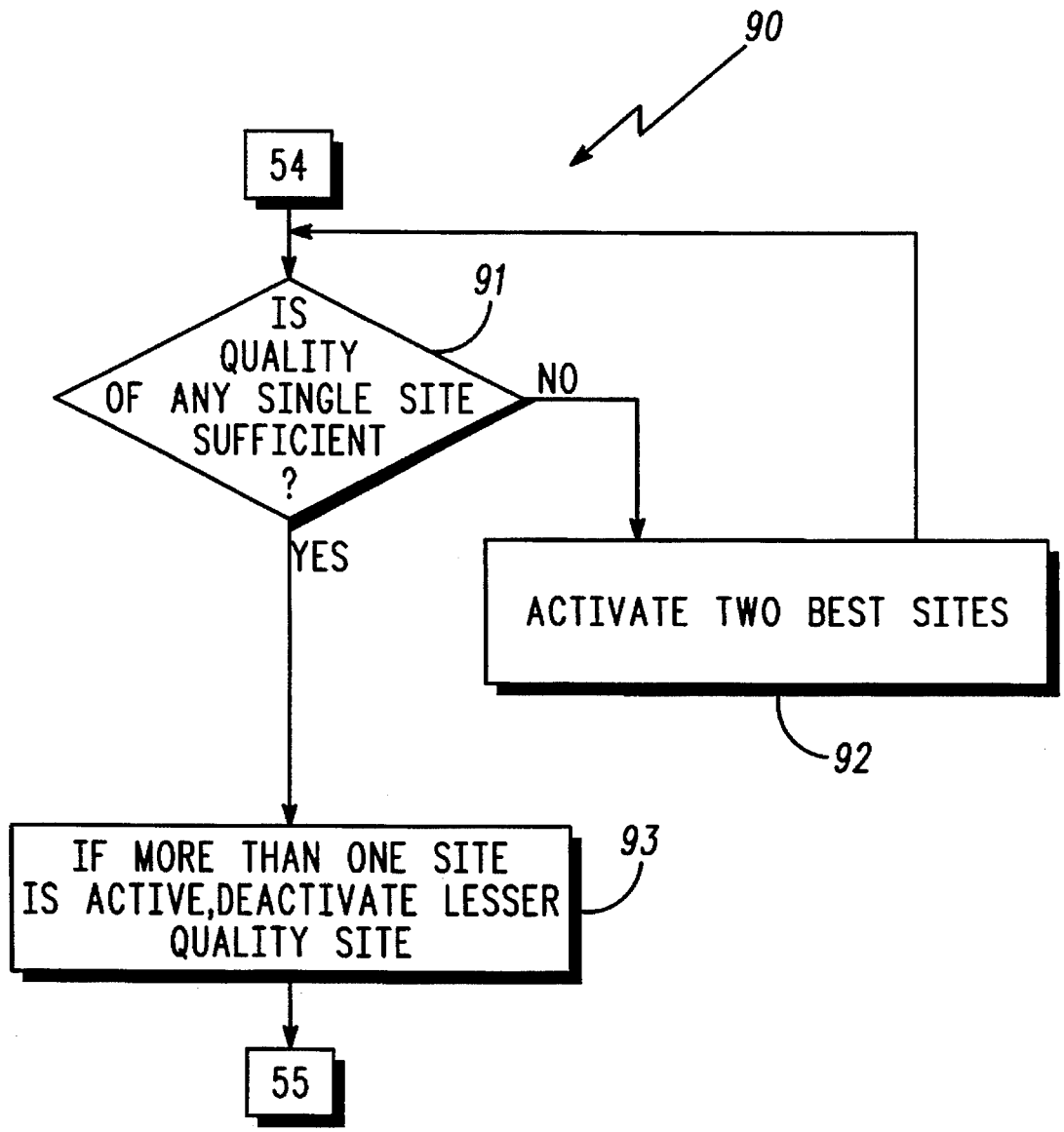
FIG. 9 is a partial flow chart modifying the flow chart of FIG. 5.

An example of how process 50, FIG. 5, could be modified to implement this is illustrated in FIG. 9. In FIG. 9, a subprocess generally designated 90, is inserted between step 54 and decision step 55 of FIG. 5. Following step 54, the process determines if the received quality of any one signal is sufficient, decision step 91. If not, the two best sites are activated (power increased) to serve the subscriber unit, step 92. Subprocess 90 then loops back to decision step 91. This continues until the received signal from one site is sufficient. At this point, if more than one site was active, then the site with the lesser quality received signal is deactivated, step 93. From here, process 50 continues with decision step 55.

Thus, it will be apparent to one skilled in the art that there has been provided in accordance with the invention, a method for controlling transmission during handoff in a communication system which fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method of controlling transmission during simultaneous handoff in a communication system, said method comprising the steps of:

A) measuring a quality factor of a signal from said subscriber received by said target transceiver;

B) increasing a transmission power from said target transceiver to said subscriber if said transmission power is below a normal power level and said quality factor meets a quality threshold; and C) reducing said transmission power from said target transceiver to said subscriber to a power level below said normal power level if said transmission power is at said normal power level and said quality factor fails to meet said quality threshold.

2. The method of claim 1 further comprising the step of repeating said steps A through C until said handoff procedure is terminated.

3. The method of claim 1 wherein said quality factor is a received signal quality factor and said quality threshold is a received signal quality threshold.

4. The method of claim 1 wherein said communication system is a code division multiple access (CDMA) communication system.

5. The method of claim 4 wherein said CDMA communication system is a direct sequence (DS) CDMA communication system.

6. The method of claim 1 further comprising the step of reducing a transmission power from a source transceiver to said subscriber if said quality factor of said signal received from said subscriber by said source transceiver fails to meet said quality threshold.

7. The method of claim 6 further comprising the step of increasing said transmission power from said source transceiver to said subscriber if said quality factor of said signal received from said subscriber by said source transceiver fails to meet said quality threshold.

8. The method of claim 1 further comprising the steps of:

terminating a transmission from a source transceiver to said subscriber if said quality factor of said signal received from said subscriber by said source transceiver fails to meet said threshold and said transmission from said target transceiver is activated; and designating said target transceiver as a new source transceiver.

9. The method of claim 1 wherein said quality factor comprises one of a reverse power control signal, a signal-to-noise ratio ($E_b/N_o$), a frame error/erasure rate (FER), a subscriber's pilot strength message, and a subscriber's received signal strength message.

10. The method of claim 1 further comprising the step of continuing to receive said signal from said subscriber at said target transceiver.

11. A method of controlling transmission during handoff in a communication system, said method comprises the steps of:

A) measuring a first quality factor and a second quality factor of a signal transmitted by said subscriber at said first and second transceivers, respectively;

B) comparing said first and second quality factors to determine a quality factor difference;

C) increasing a transmission power, from one of said first and second transceivers having a worse quality factor, to a normal power level if said transmission power is below said normal power level and said quality factor difference meets a transmit threshold; and D) reducing said transmission power, when said transmission power is at, or exceeds, said normal power level, from said one of said first and second transceivers having said worse quality factor, to a power level below said normal power level, if said quality factor difference fails to meet said transmit threshold.

12. The method of claim 11 wherein said steps A through D are repeated until said handoff procedure is terminated.

13. The method of claim 11 wherein said communication system is a code division multiple access (CDMA) communication system.

14. The method of claim 13 wherein said CDMA communication system is a direct sequence (DS) CDMA communication system.

15. The method of claim 11 wherein said step of terminating said transmission from said one of said first and second transceivers having said worst quality factor is prevented if said quality factor from a remaining one of said first and second transceivers does not meet a handoff threshold.

16. The method of claim 11 wherein said quality factor comprises one of a reverse power control signal, a signal-to-noise ratio ($E_b/N_o$), a frame error/erasure rate (FER), a subscriber's pilot strength message, and a subscriber's received signal strength message.

17. The method of claim 11 wherein said quality factor is a received signal quality factor and said quality threshold is a received signal quality threshold.

18. A method of controlling transmission during handoff in a communication system, said method comprising the steps of:

A) measuring a first handoff quality factor of a transmission between a source transceiver and a subscriber and a second handoff quality factor of a signal between a target transceiver said subscriber;

B) allocating resources at said target transceiver for communication with said subscriber unit if said second handoff quality factor meets a handoff threshold of said first handoff quality factor;

C) measuring a first received signal quality factor of said signal between said subscriber and said source transceiver and a second received quality factor of said signal between said subscriber and said target transceiver;

D) increasing a transmission power from said target transceiver to said subscriber if said transmission power from said target transceiver is below a normal power level and said second received signal quality factor meets a received signal quality threshold of said first received signal factor;

E) reducing a transmission power from said source transceiver to said subscriber if said transmission power from said source transceiver is at, or exceeds, a normal power level and said first received signal quality factor is worse than said second received signal quality factor and fails to meet said received signal quality threshold of said second received signal quality factor; and F) de-allocating resources at said source transceiver for communication with said subscriber unit if said first handoff quality factor fails to meet said handoff threshold of said second handoff quality factor.

19. The method of claim 18 wherein said communication system is a code division multiple access (CDMA) communication system.

20. The method of claim 19 wherein said CDMA communication system is a direct sequence (DS) CDMA communication system.

21. The method of claim 18 wherein said first and second received signal quality factors each comprise one of a reverse power control signal, a signal-to-noise ratio ($E_b/N_o$), a frame error/erasure rate (FER), a subscriber's pilot strength message, and a subscriber's received signal strength message.

22. The method of claim 18 wherein said first and second handoff quality factors measured at said subscriber each comprise a first transceiver's transmission received signal level or a difference between said first and a second transceiver's transmission received signal levels.

23. A method of controlling transmission during handoff in a communication system, said method comprising the steps of:

A) measuring a first handoff quality factor of a transmission between a source transceiver and a subscriber, a second handoff quality factor of a signal between a first target transceiver said subscriber, and a third handoff quality factor of a signal between a second target transceiver and said subscriber;

B) allocating resources at said first or second target transceivers for communication with said subscriber unit if said second or third handoff quality factors, respectively, meet a handoff threshold of said first handoff quality factor;

C) measuring a first received signal quality factor of said signal between said subscriber and said source transceiver, a second received quality factor of said signal between said subscriber and said first target transceiver, and a third received quality factor of said signal between said subscriber and said second target transceiver;

D) increasing a transmission power from said first or second target transceiver to said subscriber if said transmission power from said first or second target transceivers, respectively, are below a normal power level and said second or third received signal quality factors, respectively, meet a received signal quality threshold of said first received signal factor;

E) reducing a transmission power from said source transceiver to said subscriber if said transmission power from said source transceiver is at; or exceeds, said normal power level and said first received signal quality factor is worse than said second or third received signal quality factor and fails to meet said received signal quality threshold of said same second or third received signal quality factor; and F) de-allocating resources at said source transceiver for communication with said subscriber unit if said first handoff quality factor fails to meet said handoff threshold of said same second or third handoff quality factor.

\* \* \* \* \*

UNITED STATES PATENT AND TRADEMARK OFFICE
CERTIFICATE OF CORRECTION

PATENT NO. : 5,491,717
DATED : 2/13/96
INVENTOR(S) : Hall, Scott M.

It is certified that error appears in the above-indentified patent and that said Letters Patent is hereby corrected as shown below:

Column 9, line 15 reads "said threshold" should be --said quality threshold--.

Signed and Sealed this

Twenty-fifth Day of June, 1996

Attest:

BRUCE LEHMAN

Attesting Officer     Commissioner of Patents and Trademarks